(12) United States Patent
Ingrisch et al.

(10) Patent No.: US 6,462,127 B1
(45) Date of Patent: Oct. 8, 2002

(54) SELF-CROSSLINKING POLYURETHANE POLYMER HYBRID DISPERSION

(75) Inventors: Stefan Ingrisch, Seebruck (DE); Alois Maier, Engelsberg (DE); Franz Wolfertstetter, Palling (DE); Herbert Winkelmann, Garching (DE); Alfred Kern, Kirchweidach (DE); Josef Weichmann, Pleiskirchen (DE)

(73) Assignee: SKW Bauchemie GmbH, Trostberg (DE)

( * ) Notice: Subject to any disclaimer, the term of this patent is extended or adjusted under 35 U.S.C. 154(b) by 0 days.

(21) Appl. No.: 09/743,116

(22) PCT Filed: Dec. 17, 1999

(86) PCT No.: PCT/EP99/10080

§ 371 (c)(1),
(2), (4) Date: Jan. 5, 2001

(87) PCT Pub. No.: WO00/37518

PCT Pub. Date: Jun. 29, 2000

(30) Foreign Application Priority Data

Dec. 18, 1998 (DE) .......................................... 198 58 554

(51) Int. Cl.⁷ .............................. C08J 3/00; C08K 3/20; C08L 75/00; C08F 8/30; C08F 283/04
(52) U.S. Cl. ........................ 524/589; 524/591; 524/839; 524/840; 525/123; 525/127; 525/455
(58) Field of Search .................................. 525/123, 127, 525/455; 524/591, 839, 840, 589

(56) References Cited

U.S. PATENT DOCUMENTS 5,504,145 A * 4/1996 Treasurer
6,166,150 A * 12/2000 Wilke et al.

FOREIGN PATENT DOCUMENTS

| CA | 2261232 | | 4/1998 |
|----|---------|---|--------|
| DE | 196 39 325 | | 3/1998 |
| DE | 19639325 | * | 3/1998 |
| EP | 0 308 115 | | 3/1989 |
| EP | 0 444 454 | | 9/1991 |
| EP | 0 742 239 | | 11/1996 |
| EP | 0 841 357 | | 5/1998 |
| WO | 93/24551 | | 12/1993 |

* cited by examiner

Primary Examiner—Patrick D. Niland
(74) Attorney, Agent, or Firm—Fulbright & Jaworski L.L.P.

(57) ABSTRACT

A self-crosslinking polyurethane polymer hybrid dispersion based on oxidatively drying polyols having a high degree of film hardness is described, which is characterized in that it contains the reaction components claimed. The advantages of the polyurethane polymer hybrid dispersion according to the invention, such as a high degree of hardness in combination with high flexibility of the tear-free films, good resistance to chemicals, high stability of the dispersions in a wide pH range, good stability in the freezing and thawing cycle and the use of economical raw materials, are achieved in a simplified synthesis pathway wityout subsequent chemical crosslinking, and simultaneously with a low content of organic solvent (≦4% by weight) and good film formation at temperatures of ≧+10° C.

70 Claims, No Drawings

SELF-CROSSLINKING POLYURETHANE POLYMER HYBRID DISPERSION

The present invention relates to an aqueous self-crosslinking polyurethane polymer hybrid dispersion based on oxidatively drying polyols having a very high degree of film hardness and good resistance to chemicals, a process for its preparation and its use as a binder for one- or two-component finishes, seals, adhesive bonds and coatings.

Owing to their good properties, such as adhesion to various substrates, abrasion resistance and flexibility and toughness, coating systems based on aqueous polyurethane dispersions and polyurethane polymer hybrid dispersions have become increasingly important in recent years.

For numerous applications in construction chemistry, where good resistance to chemicals in addition to a high degree of hardness is desired, a combination of physical and chemical drying is of interest. Such properties are possessed by, for example, alkyd resins. Alkyd resins are oil- or fatty acid-modified polycondensates or polyesters of polycarboxylic acids or polycarboxylic anhydrides and polyalcohols. Owing to their wide possibility for variation with respect to structure and composition, but also with regard to their universal applicability, they constitute an important group of synthetic surface coating binders.

The raw materials used are natural triglycerides (oils, fats) or defined synthetic fatty acids. The property profile of the alkyd resins may be varied through the type and amount of the long-chain fatty acids or oils present. Depending on the degree of unsaturation, a distinction is made between drying, semidrying and nondrying fatty acids or oils. Depending on the content of oils, a distinction is made between short-oil, medium-oil and long-oil alkyd resins.

The curing of drying alkyd resins is based on intermolecular crosslinking of double bonds of the unsaturated fatty acids. This polymerization is initiated by autoxidation processes (so-called autoxypolymerization). For the catalytic acceleration of the autoxidative drying and film formation, active and auxiliary drying agents or siccatives, which are generally metal salts of organic acids, may be added to the alkyd resins.

Alkyd resins can be reacted with other components, such as polyisocyanates, polyols, phenolic resins, epoxides, etc., to give polyurethane alkyd resins. In this reaction, long-oil alkyd resins containing hydroxyl groups are reacted with polyisocyanates in suitable organic solvents until free isocyanate groups are no longer present. These solvent-containing urethane alkyds are suitable in particular for high-quality coatings, primers, finishes and seals and are distinguished by rapid drying, a high degree of hardness, excellent mechanical stability, very good abrasion resistance, high water resistance and improved resistance to chemicals.

Fatty acid-modified, oxidatively drying polyurethane dispersions are synergistic combinations of alkyd resins and polyurethane resins, which combine the excellent property profile of both types of polymers. These self-crosslinking aqueous polyurethane dispersions can be prepared in the absence of a solvent (zero VOC) or in the presence of little solvent (low VOC) and are accordingly substantially more environmentally friendly than conventional solvent-containing urethane alkyds.

The preparation of aqueous polyurethanes has been known for-many years and is described in detail in many publications, e.g. Houben-Weyl, Methoden der organischen Chemie [Methods of Organic Chemistry], Volume E 20, Part I, pages 1659–81; D. Dieterich, Prog. Org. Coat, 1981, 9, 281–330; J. W. Rosthauser, K. Nachtkamp, Journal of Coated Fabrics 1986, 16, 39–79; R. Arnoldus, Surf. Coat. 1990, 3 (Waterborne Coat.), 179–98.

The polyurethane polymer hybrid dispersions, which are more economical compared with polyurethane dispersions, are suitable in particular for finishing, coating, sealing and adhesive bonding of the surfaces of metallic and mineral substrates and of wood-based materials and plastics.

The polyurethane polymer hybrid dispersions are synergistic combinations of pure polyurethane dispersions and pure plastics dispersions, whose property profile cannot be achieved by simply mixing the two types of dispersions. Polyurethane polymer hybrid dispersions are based on interpenetrating networks of polyurethane polymers and acrylate polymers, which may be linked to one another both physically and chemically. This type of dispersion requires special synthetic methods.

Fatty acid-modified, oxidatively drying polyurethane polymer hybrid dispersions are modified in a polyurethane dispersion as matrix by a type of emulsion polymerization of acrylate and styrene derivatives. This makes it possible for the excellent properties of an oxidatively drying polyurethane dispersion to be combined synergistically with the cost benefit of a plastics dispersion.

Pure polyurethane dispersions are too expensive for a large number of applications in construction chemistry. In the polyurethane polymer hybrid dispersions, the advantageous properties of the pure polyurethane dispersions are therefore combined with the cost benefit of the pure plastics dispersions. For these reasons, the more economical polyurethane polymer hybrid dispersions are becoming increasingly important compared with conventional polyurethane dispersions in application in construction chemistry.

With regard to compliance with existing and future emission directives, too, considerable efforts have been made in recent years to develop water-based polyurethane polymer hybrid dispersions having as low a content as possible of volatile organic compounds (VOC). These low-solvent (low VOC) or solvent-free (zero VOC) products offer both ecological and economic advantages and correspond in their performance and their material properties substantially to conventional polyurethane systems.

In construction chemistry, in particular self-crosslinking polyurethane polymer hybrid dispersions having a very high degree of hardness and good resistance to chemicals are desirable for cost reasons, said dispersions being obtainable with the aid of efficient and simultaneously universal preparation processes.

The hybrid systems known from the relevant patent literature still have a number of disadvantages which limit replacement of polyurethane dispersions in specific fields of use.

Thus, known preparation processes for polyurethane polymer hybrid dispersions, as described, for example, in the publications EP 0 649 865 A1, EP 0 657 483 A1, EP 0 742 239 A1 and U.S. Pat. No. 5,521,246, are very expensive with respect to the synthetic procedure.

The patent application EP 0 649 865 A1 discloses a process in which a part of the acrylate component is added to the prepolymer solution during the polyol-isocyanate reaction. The second part of the acrylate component is metered in at a later time and the last part is added to the prepolymer solution before the dispersing.

According to the patent application EP 0 657 483 A1, the acrylate component is metered in in a plurality of steps during the polyurethane prepolymer synthesis itself at 70° C. Before the dispersing in water, a further part of the acrylate component is then added to the polyurethane-acrylate prepolymer, and the initiator component, dissolved in an organic solvent or as such, is then added at 80° C.

U.S. Pat. No. 5,521,246 describes a similar process in which the acrylate component is likewise added stepwise during the polyurethane prepolymer synthesis at 75° C. After the neutralization at 25° C. and the dispersing in water, the initiator component, dissolved in N-methylpyrrolidone, is added. Only thereafter is the chain extension with ethylenediamine effected and the last part of the acrylate component added to the dispersion. Polymerization is carried out for 2 to 3 hours at a temperature of 65° C. However, publications on the polymerization of acrylates with 2,2'-azobisisobutyronitrile demonstrates that these conditions are insufficient for complete monomer conversion.

As disclosed in EP 0 742 239 A1 and EP 0 668 300 A1, additional emulsifiers (surfactants) are often necessary in order to ensure sufficient stability of the polyurethane micelles during the polymerization.

High degrees of film hardness of polyurethane polymer hybrid dispersions as described in the publications EP 0 657 483 A1 and EP 0 668 300 A1 have been achieved to date either by complicated synthesis methods or by chemical postcrosslinking of the dispersions using corresponding reagents or, as described in WO 93/24551, by fatty acid-modified polyester polyols. EP 0 745 625 A1 discloses, for example, a polyurethane dispersion in which bisaldimines, which are in equilibrium with the corresponding bisenamines, are incorporated into polyurethane prepolymers via amino groups, with the result that the hardness of the resulting polyurethane dispersions is increased. High degrees of hardness are also achieved in said patents often only with hybrid dispersions which, owing to their complicated synthesis, contain relatively large amounts of organic solvents ($\geq$10% by weight) and have a minimum film formation temperature of $\geq$20° C.

The object of the present invention was to develop a self-crosslinking oxidatively drying polyurethane polymer hybrid dispersion which has a high degree of film hardness and good resistance to chemicals and which does not have the stated disadvantages of the prior art and at the same time can be prepared economically by a simple synthesis pathway.

This object was achieved, according to the invention, by providing a self-crosslinking polyurethane polymer hybrid dispersion having a high degree of film hardness, which is obtainable by reacting the reaction components (A) to (I) mentioned below. The dispersion thus contains, as reaction components, (A) an unsaturated fatty acid component capable of oxidative drying and having at least two hydroxyl groups reactive toward polyisocyanates, (B) a polyol component consisting of
   (i) a high molecular weight polyol having at least two hydroxyl groups reactive toward polyisocyanates and a molar mass of from 500 to 4000 Dalton,
   (ii) a low molecular weight polyol having at least two hydroxyl groups reactive toward polyisocyanates and a molar mass of from 50 to 500 Dalton,
   (iii) a low molecular weight and anionically modifiable polyol having at least two hydroxyl groups reactive toward polyisocyanates and at least one carboxyl group inert to polyisocyanates and a molar mass of from 100 to 200 Dalton, (C) a polyisocyanate component, (D) optionally a siccative component, (E) optionally a solvent component consisting of
   (i) at least one organic solvent inert to polyisocyanates and/or
   (ii) a reactive diluent inert to polyisocyanates and consisting of at least one organic compound inert to polyisocyanates and having one or more double bonds capable of free radical polymerization, (F) a neutralization component consisting of at least one inorganic or organic base, (G) a chain-extending component consisting of at least one polyamine having two or more amino groups reactive toward polyisocyanates, (H) a monomer component consisting of at least one monomer having one or more double bonds capable of free radical polymerization and (I) a free radical initiator component and contains water as the remainder.

Preferably, the dispersion contains the reaction components (A) from 0.3 to 12% by weight of an unsaturated fatty acid component capable of oxidative drying and consisting of at least one unsaturated fatty acid derivative or fatty acid epoxy ester having at least two hydroxyl groups reactive toward polyisocyanates, (B) from 1.5 to 18% by weight of a polyol component consisting of
   (i) from 0.5 to 12% by weight of a high molecular weight polyol having two or more hydroxyl groups reactive toward polyisocyanates and a molar mass of from 500 to 4000 Dalton,
   (ii) from 0.5 to 3.0% by weight of a low molecular weight polyol having two or more hydroxyl groups reactive toward polyisocyanates and a molar mass of from 50 to 500 Dalton,
   (iii) from 0.5 to 3.0% by weight of a low molecular weight and anionically modifiable polyol having two or more hydroxyl groups reactive toward polyisocyanates and one or more carboxyl groups inert to polyisocyanates and a molar mass of from 100 to 200 Dalton, (C) from 3.5 to 16% by weight of a polyisocyanate component consisting of one or more polyisocyanates, polyisocyanate homologs or polyisocyanate derivatives having two or more aliphatic and/or aromatic isocyanate groups, (D) from 0 to 2% by weight of a siccative component consisting of at least one water-emulsifiable active or auxiliary drying agent, (E) from 0 to 8% by weight of a solvent component consisting of
   (i) at least one organic solvent which is inert to polyisocyanates and, after the preparation of the polyurethane polymer hybrid dispersion, may remain therein or can be completely or partially removed by distillation and/or
   (ii) a reactive diluent inert to polyisocyanates and consisting of at least one organic compound inert to polyisocyanates and having one or more double bonds capable of free radical polymerization, (F) from 0.3 to 2.5% by weight of a neutralization component consisting of at least one inorganic or organic base, (G) from 0.1 to 1.5% by weight of a chain-extending component consisting of one or more polyamines having two or more amino groups reactive toward polyisocyanates, (H) from 5 to 45% by weight of a monomer component consisting of one or more monomers having one or more double bonds capable of free radical polymerization and (I) from 0.05 to 2% by weight of an initiator component consisting of at least one lipophilic free radical initiator which preferably has a half-life of one hour at a decomposition temperature within the range from 40 to 120° C., and contains water as the remainder.

It has surprisingly been found that the oxidatively drying polyurethane polymer hybrid dispersion according to the invention has very good performance characteristics, such as a high degree of film hardness and resistance to chemicals and excellent stability of the dispersion and stability in the freezing and thawing cycle.

The fatty acid component (A) capable of oxidative drying and intended for synthesizing the polyurethane polymer hybrid dispersion proposed according to the invention, in an amount of preferably from 0.3 to 12% by weight, based on the total weight of the components (A) to (I) with water, consists of at least one unsaturated fatty acid derivative having two or more, e.g. three, hydroxyl groups reactive toward polyisocyanates, obtainable from unsaturated fatty acids and aliphatic and/or aromatic epoxy resins or polyepoxides having two or more, e.g. three, epoxide groups reactive toward fatty acids. These fatty acid derivatives or fatty acid epoxy esters are obtained, for example, by stoichiometric reaction of mono-, di-, or triunsaturated fatty acids having an iodine number of from 170 to 190 g $I_2.(100$ g$)^{-1}$ and aliphatic and/or aromatic epoxy resins or polyepoxides having an epoxide number >0.5 eq $(100$ g$)^{-1}$ at temperatures of at least 140° C. under catalysis with tetraalkylammonium halides. In this reaction or addition reaction, the carboxyl groups of the unsaturated fatty acids react with the epoxide groups of the epoxy resins with formation of fatty acid-modified and low molecular weight polyols. The component (A) preferably has an iodine number of from 100 to 150 g $I_2.(100$ g$)^{-1}$, a hydroxyl number of from 120 to 150 mg KOH.g$^{-1}$, an acid number of from 1 to 5 mg KOH.g$^{-1}$ and a viscosity of from 2500 to 25,000 mPa.s (20° C.).

The term "unsaturated fatty acids" preferably relates to commercial mixtures of predominantly polyunsaturated fatty acids which can be obtained from drying oils by hydrolysis and refining. Drying oils are naturally occurring fats and oils which have a high content of polyunsaturated monocarboxylic acids in the triglyceride-system. A high drying capacity is ensured by unsaturated fatty acids having a high content of monocarboxylic acids with 18 carbon atoms and 2 or 3 double bonds per molecule, such as linoleic acid (9,12-octadecadienoic acid) and linolenic acid (9,12, 15-octadecatrienoic acid). Suitable unsaturated fatty acids are, for example, linseed oil fatty acid, conophor oil fatty acid, lallemantia oil fatty acid, stillingia oil fatty acid, soybean oil fatty acid, safflower oil fatty acid, Konjuen fatty acids and fatty acids from dehydrated castor oil, but preferably linseed oil fatty acid having an acid number of from 198 to 202 mg KOH.g$^{-1}$ and an iodine number of from 170 to 190 g $I_2.(100$ g$)^{-1}$. Alternatively, synthetic unsaturated fatty acids or fatty acid mixtures may also be used.

Epoxy resins or polyepoxides are obtained by reacting epichlorohydrin with polyalcohols or polyamines having active hydrogen atoms or by epoxidation of unsaturated compounds. Suitable polyepoxides are, for example, the polyfunctional glycidyl derivatives, obtained by reaction with epichlorohydrin, of 2,2'-bis(4-hydroxyphenyl)propane (bisphenol A), 2,2,'-bis(4-hydroxyphenyl)methane (bisphenol F), 1,1,2,2-tetrakis(4-hydroxyphenyl)ethane, phenol/formaldehyde condensates of the novolak type, 1,4-butanediol, 1,4-bis(hydroxymethyl)cyclohexane (cyclohexanedimethanol), 1,2,3-propanetriol (glycerol), 2-ethyl-2-hydroxymethyl-1,3-propanediol (trimethylolpropane), aminobenzene, 4-aminophenol, 2,4,6-trihydroxy-1,3,5-triazine (isocyanuric acid). Glycidyl derivatives are understood as meaning epoxy resins or polyepoxides. Polyepoxides having an epoxide number greater than 0.5 eq.$(100$ g$)^{-1}$ are preferably used.

Polyepoxides based on bisphenol A and bisphenol F, such as bisphenol A diglycidyl ether and bisphenol F diglycidyl ether, are particularly suitable for oxidatively drying diols, and polyepoxides based on 2,4,6-trihydroxy-1,3,5-triazine, such as isocyanuric acid tris(2,3-epoxypropyl) ester or 1,3, 5-Tris(2,3-epoxypropyl)-1,3,5-trihydrotriazine-2,4,6-trione, for oxidatively drying triols. The chemistry of the epoxy resins is described in detail in the handbook "Chemistry and Technology of Epoxy Resins" by B. Ellis (Editor), Blackie Academic & Professional, Glasgow 1993. According to a preferred embodiment, an adduct of linseed oil fatty acid and bisphenol A diglycidyl ether is used as component (A).

The poly component (B) for synthesizing the polyurethane polymer hybrid dispersion proposed according to the invention, in an amount of preferably from 1.5 to 18% by weight, based on the total weight of the components (A) to (I) with water, consists of the three individual components (B) (i), (B) (ii) and (B) (iii).

The component (B) (i), in an amount of preferably from 0.5 to 12% by weight, based on the total weight of the components (A) to (I) with water, consists of at least one relatively high molecular weight polyol having two or more hydroxyl groups reactive toward polyisocyanates and an average molar mass (number average $M_n$) of from 500 to 4000 Dalton. These may be polymeric polyols, such as polyalkylene glycols, aliphatic and/or aromatic polyesters, polycaprolactones, polycarbonates, macromonomers, telechelic polymers or epoxy resins or mixtures thereof. Polyalkylene glycols are obtained from monomers such as ethylene oxide, propylene oxide, butylene oxide and tetrahydrofuran by polymerization in the presence of boron trifluoride or by polyaddition with initiator compounds having reactive hydrogen atoms, such as water, alcohols, amines or bisphenol A. Mixtures of the monomers may also be used simultaneously or in succession. Suitable polyalkylene glycols which may be used are, for example, polyethylene glycols, polypropylene glycols (e.g. Voranol types from Dow), mixed polyglycols based on ethylene oxide and propylene oxide and polytetramethylene glycols and polytetrahydrofurans (e.g. Poly THF 2000 from BASF). Aliphatic and/or aromatic polyesterpolyols are obtained by polycondensation reaction and/or polyaddition reaction from dihydric or polyhydric alcohols and dibasic or polybasic carboxylic acids, carboxylic anhydrides or carboxylic esters. Suitable aliphatic or aromatic polyesters which may be used are, for example, condensates based on 1,2-ethanediol (ethylene glycol), 1,4-butanediol (1,4-butylene glycol), 1,6-hexanediol (1,6-hexamethylene glycol) and 2,2-dimethyl-1,3-propanediol (neopentyl glycol) and 1,6-hexanedioic acid (adipic acid) and 1,3-benzenedicarboxylic acid (isophthalic acid) (e.g. Bester types from Poliolchimica). Polycaprolactones (e.g. Capa types from Solvay Interox) and polycarbonates (e.g. Desmophen C 200 from Bayer) also belong to the group of polyesters. The former are obtained by reacting phosgene or aliphatic or aromatic carbonates, such as, for example, diphenyl carbonate or diethyl carbonate, with dihydric or polyhydric alcohols. The latter are prepared by polyaddition of lactones, such as, for example, ε-caprolactone, with initiator compounds having reactive hydrogen atoms, such as water, alcohols, amines or bisphenol A. Synthetic combinations of polyesters, polycaprolactones and polycarbonates are also possible. Also suitable are macromonomers, telechelic polymers or epoxy resins. The macromonomers and telechelic polymers are polyhydroxyolefins, such as, for example, α,ω-dihydroxypolybutadienes, α,β-dihydroxy(meth)acrylic acid ester, α,ω-dihydroxy(meth)acryl acid ester or α,ω-dihydroxypolysiloxanes. The epoxy resins are preferably derivatives of bisphenol A diglycidyl ether (BADGE). Linear difunctional aliphatic or aromatic polyesterpolyols having an average molecular mass (number average $M_n$) of from 1000 to 4000 Dalton and in particular from 1000 to 3000 Dalton are preferred. Difunctional linear polyesterpolyols based on adipic acid, 1,4-butylene glycol and ethylene glycol are particularly preferably used.

The component (B) (ii), in an amount of preferably from 0.5 to 3.0% by weight, based on the total weight of the components (A) to (I) with water, consists of at least one low molecular weight polyol having two or more hydroxyl groups reactive toward polyisocyanates and a molar mass of from 50 to 500 Dalton. Suitable low molecular weight polyols which may be used are, for example, 1,2-ethanediol (ethylene glycol), 1,2-propanediol (1,2-propylene glycol), 1,3-propanediol (1,3-propylene glycol), 1,4-butanediol (1,4-butylene glycol), 1,6-hexanediol (1,6-hexamethylene glycol), 2-methyl-1,3-propanediol (trade name MPDiol Glycol® from Arco Chemical), 2,2-dimethyl-1,3-propanediol (neopentyl glycol), 1,4-bis(hydroxymethyl)cyclohexane (cyclohexanedimethanol), 1,2,3-propanetriol (glycerol), 2-hydroxymethyl-2-methyl-1,3-propanol (trimethylolethane), 2-ethyl-2-hydroxymethyl-1,3-propanediol (trimethylolpropane), 2,2-bis(hydroxymethyl)-1,3-propanediol (pentaerythritol). 1,4-Butylene glycol or 1,4-butylene glycol in combination with trimethylolpropane are preferably used.

The component (B) (iii), in an amount of preferably from 0.5 to 3.0% by weight, based on the total weight of the components (A) to (I) with water, consists of at least one low molecular weight and anionically modifiable polyol having two or more hydroxyl groups reactive toward polyisocyanate and one or more carboxyl groups which are inert to polyisocyanate and some or all of which can be converted into carboxylate groups in the presence of bases. Low molecular weight and anionically modifiable polyols having a molecular weight of from 100 to 200 Dalton which may be used are, for example, 2-hydroxymethyl-3-hydroxypropanoic acid (dimethylolacetic acid), 2-hydroxymethyl-2-methyl-3-hydroxypropanoic acid (dimethylolpropionic acid), 2-hydroxymethyl-2-ethyl-3-hydroxypropanoic acid (dimethylolbutyric acid), 2-hydroxymethyl-2-propyl-3-hydroxypropanoic acid (dimethylolvaleric acid), citric acid and tartaric acid. Bishydroxyalkanecarboxylic acids are preferably used, particularly preferably 2-hydroxymethyl-2-methyl-3-hydroxypropanoic acid (dimethylolpropionic acid) (trade name DMPA® from Mallinckrodt).

The polyisocyanate component (C), in an amount of preferably from 3.5 to 16% by weight, based on the total weight of the components (A) to (I) with water, consists of at least one polyisocyanate, polyisocyanate derivative or polyisocyanate homolog having two or more aliphatic and/or aromatic isocyanate groups. The polyisocyanates sufficiently well known in polyurethane chemistry, or combinations thereof, are particularly suitable. Suitable aliphatic polyisocyanates which may be used are, for example, 1,6-diisocyanatohexane (HDI), 1-isocyanato-5-isocyanatomethyl-3,3,5-trimethylcyclohexane (IPDI), bis(4-isocyanatocyclohexyl)methane ($H_{12}$MDI), 1,3-bis(1-isocyanato-1-methylethyl)benzene (m-TMXDI) and industrial isomer mixtures of the individual aromatic polyisocyanates. Suitable aromatic polyisocyanates which may be used are, for example, 2,4-diisocyanatotoluene (TDI), bis(4-isocyanatophenyl)-methane (MDI) and optionally its higher homologs (polymeric MDI) and industrial isomer mixtures of the individual aromatic polyisocyanates. Furthermore, the so-called "surface coating polyisocyanates" based on bis(4-isocyanatocyclohexyl)methane ($H_{12}$MDI), 1,6-diisocyanatohexane (HDI), 1-isocyanato-5-isocyanatomethyl-3,3,5-trimethylcyclohexane (IPDI) are in principle also suitable. The term "surface coating polyisocyanates" denotes allophanate, biuret, carbodiimide, isocyanurate, uretdione or urethane group-containing derivatives of these diisocyanates in which the residual content of monomeric diisocyanates has been reduced to a minimum according to the prior art. It is also possible to use modified polyisocyanates, which are obtainable, for example, by hydrophilic modification of "surface coating polyisocyanates" based on 1,6-diisocyanatohexane (HDI). The aliphatic polyisocyanates are preferable to the aromatic polyisocyanates. Furthermore, polyisocyanates having isocyanate groups of different reactivities are preferred. In particular, isophorone diisocyanate or 1-isocyanato-5-isocyanatomethyl-3,3,5-trimethylcyclohexane or the industrial isomer mixtures thereof are used.

The optionally present siccative component (D), in an amount of preferably up to 2% by weight, based on the total weight of the components (A) to (I) with water, consists of water-emulsifiable active and auxiliary drying agents or mixtures thereof. These siccatives or drying agents are as a rule organometallic metal soaps and metal soaps soluble in aliphatic or aromatic solvents or are conventional metal salts with metals of the elements from main group II to IV or subgroup II, IV, VII and VIII or of the rare earths of the Periodic Table. The metal salts preferably consist of inorganic metal halides (F, Cl, Br, I), nitrates, sulfonates, formates, acetates or oxo salts. Suitable, catalytically active metals are: aluminum, barium, lead, calcium, cerium and rare earths generally, iron, cobalt, manganese, mercury, zinc, zirconium, copper, magnesium and nickel. In the case of the metal soaps, the "metal carrier" (=carboxylate anions) comprise predominantly monocarboxylic acids. Here, the metal soaps may be "neutral soaps", "acid soaps", "basic soaps" or "organic complex or mixed soaps". Drying agents as catalysts accelerate the decomposition of the peroxides formed as intermediates in the presence of oxygen and hence the oxidative drying or crosslinking. Active drying agents are based on metals having a plurality of oxidation states which are accessible to redox reactions, such as, for example, cobalt and manganese. Auxiliary drying agents have an effect which promotes drying only in combination with active drying agents and are based on metals having only one oxidation stage, such as, for example, barium, calcium and zinc. Water-emulsifiable active and auxiliary drying agents or water-emulsifiable combination drying agents are preferably used, such as, for example, drying agents based on cobalt, manganese, barium, zinc or calcium.

The optionally present solvent component (E) (i), in an amount of preferably up to 8% by weight, based on the total weight of the components (A) to (I) with water, consists of at least one solvent which is inert to polyisocyanates and is preferably completely or partially miscible with water and which, after the preparation, may remain in the polyurethane dispersion or can be completely or partially removed by distillation. Suitable solvents are, for example, high-boiling and hydrophilic organic solvents, such as N-methylpyrrolidone, diethylene glycol dimethyl ether, dipropylene glycol dimethyl ether (Proglyde DMM® from Dow), low-boiling solvents, such as acetone, butanone or any desired mixtures thereof. A high-boiling and hydrophilic solvent, such as N-methylpyrrolidone, is preferably used and, after the preparation, may remain in the dispersion and can act as a coalescence auxiliary.

The optionally present solvent component (E) (ii), in an amount of preferably up to 8% by weight, based on the total weight of the components (A) to (I) with water, is composed of at least one reactive diluent inert to polyisocyanates and consisting of at least one organic compound (such as, for example, polyethylene glycol) which is inert to polyisocyanates and contains one or more double bonds capable of free radical polymerization. Suitable solvents are, for example, derivatives of acrylic acid, such as methoxypolyethylene glycol methacrylates, polyethylene glycol dimethacrylates, methyl methacrylate, n-butyl acrylate, methyl acrylate, acetoacetoxyethyl methacrylate or polyethylene glycol methyl vinyl ether, N-vinylimidazole and N-vinylpyrrolidone. Methoxy-polyethylene glycol methacrylates having from 2 to 20 ethylene glycol units and methacrylates are preferably used.

The neutralization component (F), in an amount of preferably from 0.3 to 2.5% by weight, based on the total weight of the components (A) to (I) with water, consists of one or more inorganic and/or organic base(s) which serve for neutralizing some or all of the carboxyl groups, in particular of component (B) (iii). Suitable bases which may be used are tertiary amines, such as N,N-dimethylethanolamine, N-methyldiethanolamine, N-methyldiisopropanolamine, dimethylisopropanolamine, N-methylmorpholine, N-ethylmorpholine, triethanolamine, triethylamine, triisopropylamine or ammonia, or alkali metal hydroxides, such as lithium hydroxide, sodium hydroxide or potassium hydroxide. Tertiary amines and in particular triethylamine are preferably used.

With the neutralization component (F), in an amount from 0.3 to 2.5% by weight, direct and/or indirect neutralization, i.e. anionic modification of the polyurethane prepolymer, is carried out before and/or during dispersing. During the neutralization, carboxylate groups are formed from the carboxyl groups and serve for anionic modification of the polyurethane dispersion and polyurethane base dispersion and of the polyurethane polymer hybrid dispersion prepared therefrom.

The chain-extending component (G), in an amount of preferably from 0.1 to 1.5% by weight, based on the total weight of the components (A) to (I) with water, consists of at least one polyamine having two or more amino groups reactive toward polyisocyanates. Suitable polyamines are, for example, adipic acid dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS) and ethylenediamine or any desired combinations of these polyamines. Difunctional primary amines, in particular 1,2-diaminoethane (ethylenediamine) are preferably used. The chain extension of the polyurethane prepolymer dispersion leads to an increase in the molecular weight within the micelles and to the formation of a polyurethane-polyurea dispersion of high molecular weight. The reactive isocyanate groups react with the chain-extending component substantially more rapidly than with water. The isocyanate groups of the polyurethane prepolymers are converted into urea groups. Thereafter, any free isocyanate groups still present undergo complete chain extension with water. According to a preferred embodiment, the component (G) contains from 20 to 80% by weight, in particular about 50% by weight, of dispersing medium (water).

The solids content of the polyurethane polymer consisting of the components (A) to (G) is preferably from 20 to 60% by weight, in particular from 30 to 50% by weight, based on the total weight of the initially prepared polyurethane base dispersion. The micelles of the polyurethane polymer have a preferred mean particle size of from 50 to 500 nm, in particular from 100 to 200 nm. In addition, the polyurethane polymer has an average molar mass of preferably from 25,000 to 100,000 Dalton.

The monomer component (H), in an amount of preferably from 5 to 45% by weight, based on the total weight of the components (A) to (I) with water, consists of one or more monomers having one or more double bonds capable of free radical polymerization. Suitable monomers are, for example, derivatives of acrylic acid, such as methacrylic acid, methacrylic acid anhydride, methacrylonitrile, methacrylamide, methyl methacrylate, ethyl methacrylate, n-butyl methacrylate, isobutyl methacrylate, n-hexyl methacrylate, cyclohexyl methacrylate, 2-ethylhexyl methacrylate, isobornyl methacrylate, benzyl methacrylate, 2-hydroxyethyl methacrylate, hydroxypropyl methacrylate, 2-hydroxyethyl acrylate, hydroxypropyl acrylate, 2-dimethylaminoethyl methacrylate, ethyltriglycol methacrylate, tetrahydrofurfuryl methacrylate, methacrylic acid anhydride, allyl methacrylate, ethylene glycol dimethacrylate, diethylene glycol dimethacrylate, triethylene glycol dimethacrylate, tetraethylene glycol dimethacrylate, polyethylene glycol-400 dimethacrylate, 1,3-butanediol dimethacrylate, 1,4-butanediol dimethacrylate, 1,6-hexanediol dimethacrylate, methyl acrylate, n-butyl acrylate, n-hexyl acrylate, n-octyl acrylate, n-octyl methacrylate, acrylic acid, acetoacetoxyethyl methacrylate, acrylamide, N-butoxymethyl methacrylamide, N-isobutoxymethyl methacrylamide, 2-acrylamido-2-methylpropane-1-sulfonic acid (AMPS), methoxypolyethylene glycol methacrylates, methoxypolyethylene glycol acrylates, polyethylene glycol dimethacrylates or styrene derivatives, such as styrene, methylstyrene or ethylstyrene. Acrylic acid (propenoic acid) and its derivatives and/or methacrylic acid (2-methylpropenoic acid) and its derivatives and/or styrene and its derivatives are preferably used. Combinations of from 75 to 85% by weight of methyl methacrylate, from 5 to 15% by weight of n-butyl acrylate and from 10 to 20% by weight of further monomers are preferably used, particularly preferably combinations of 85% by weight of methyl methacrylate and 15% by weight of n-butyl acrylate or of 75% by weight of methyl methacrylate, 15% by weight of n-butyl acrylate and 10% by weight of styrene.

The initiator component (I), in an amount of preferably from 0.05 to 2% by weight, based on the total weight of the components (A) to (I) with water, consists of at least one lipophilic free radical initiator which preferably has a half-life of one hour at a decomposition temperature within the range from 40 to 120° C., i.e. there is, within the range from 40 to 120° C., a temperature at which the initiator used undergoes 50% decomposition. Suitable initiators are, for example, peroxide initiators, such as dilauroyl peroxide, dibenzoyl peroxide, tert-amyl peroxyneodecanoate, tert-butyl peroxyneodecanoate, tert-butyl peroxypivalate, 2,5-dimethyl-2,5-di(2-ethylhexanoylperoxy)hexane, tert-amyl peroxy-2-ethylhexanoate, tert-butyl peroxy-2-ethylhexanoate, tert-amyl peroxybenzoate or tert-butyl peroxybenzoate, persulfate initiators, such as ammonium peroxodisulfate, sodium peroxodisulfate or potassium peroxodisulfate, azo initiators, such as 2,2'-azobis(2-cyclopropylpropionitrile), 2,2'-azobis(2,4-dimethylvaleronitrile), 2,2'-azobis(2-methylbutyronitrile), 2,2'-azobis(2-methylpropionitrile) or 1,1'-azobis-(cyclohexane-1-carbonitrile). Free radical initiators having one or more azo or peroxo groups which have a half-life of one hour at a decomposition temperature of from 70 to 90° C. are preferably used. 2,2'-Azobis(2-methylpropionitrile) or 2,2'-azobisisobutyronitrile is particularly preferably used.

The solids content of the polyurethane polymer hybrid dispersion is from 20 to 60% by weight, preferably from 30 to 50% by weight, based on the total amount of the pure polyurethane polymer hybrid dispersion. Here, the ratio of the proportionate solids contents of polyurethane resin and polymer resin is in particular 20 to 80:80 to 20% by weight, preferably 40 to 60:60 to 40% by weight, particularly preferably about 50:50% by weight.

The mean particle sizes of the micelles of the polyurethane hybrid polymer are preferably from 50 to 500 nm, in particular from 50 to 250 nm. The polyurethane hybrid polymer has a preferred average molar mass of from 25,000 to 250,000 Dalton.

The invention furthermore relates to a process for the preparation of a polyurethane polymer hybrid dispersion, characterized in that, in the reaction stage (a), a polyurethane base dispersion is first prepared, (a1) the fatty acid component (A), the polyol component (B) (i), (B) (ii) and (B) (iii) being reacted with the polyisocyanate component (C), optionally in the presence of a siccative component (D) and of a solvent component (E) and optionally in the presence of a catalyst to give a polyurethane prepolymer, (a2) the polyurethane prepolymer from stage (a1) being mixed with the dispersing medium and the neutralization component (F) and then (a3) the polyurethane prepolymer dispersion from stage (a2) being reacted with the chain-extending component (G), and then, in the reaction stage (b), a polyurethane polymer hybrid dispersion being prepared by (b1) adding a prepared mixture of the monomer component (H) and of the initiator component (I) to the polyurethane base dispersion from stage (a3) and then (b2) carrying out a free radical polymerization of the component (H) within the micelles of the polyurethane base dispersion by thermal decomposition of the component (I).

For the preparation of the polyurethane polymer hybrid dispersion according to the invention, a polyurethane base dispersion is prepared in the reaction stage (a) with the aid of a prepolymer mixing process using the techniques customary in polyurethane chemistry. For this purpose, preferably from 0.3 to 12% by weight of the fatty acid component (A) capable of oxidative drying, preferably from 0.5 to 12% by weight of the relatively high molecular weight polyol component (B) (i), preferably from 0.5 to 3.0% by weight of the low molecular-weight polyol component (B) (ii) and preferably from 0.5 to 3.0% by weight of the low molecular weight and anionically modifiable polyol (B) (iii) are reacted with preferably from 3.5 to 16% by weight of the polyisocyanate component (C), optionally in the presence of from 0 to 2% by weight of the siccative component (D) and optionally in the presence of from 0 to 8% by weight of the solvent component (E) at a temperature of preferably from 60 to 120° C., particularly preferably from 80 to 100° C., in process step (a1) to give a polyurethane prepolymer. Here, the NCO/OH equivalent ratio of the components (A), (B) and (C) is preferably from 1.2 to 2.0, particularly preferably from 1.4 to 1.8. The polyurethane prepolymer can optionally be prepared in the presence of from 0.01 to 1% by weight, based on the components (A), (B), (C), (D) and (E), of a catalyst customary for polyaddition reactions with polyisocyanates.

The resulting polyurethane prepolymer from stage (a1) is mixed, in process step (a2), with the dispersing medium and the neutralization component (F). For indirect neutralization, the prepolymer is transferred, preferably at a temperature of from 30 to 60° C., in particular from 40 to 50° C., to the dispersing medium water, which preferably contains from 0.3 to 2.5% by weight of the component (F) required for neutralization. In the case of a direct neutralization, the neutralization component (F) may be stirred into the polyurethane prepolymer after reaction stage (a1). The neutralization component is preferably added in an amount such that the degree of neutralization, based on the free carboxyl groups of the polyurethane prepolymer, is from 70 to 100 equivalent %, in particular from 90 to 100 equivalent %. Within the scope of the present invention, it is also possible for the siccative component (D) not to be initially introduced in the dispersing medium until reaction stage (a2).

Thereafter, in process stage (a3), the polyurethane prepolymer dispersion from stage (a2) is reacted with preferably from 0.1 to 1.5% by weight of the chain-extending component (G) which is required for chain extension and which is preferably present in solution, for example dissolved in portions of the dispersing medium which have been removed before the addition, at temperatures of preferably from 20 to 60° C., in particular from 30 to 50° C., the component (G) containing preferably from 20 to 80% by weight, in particular 50% by weight, dispersing medium. The chain-extending component (G) is preferably used in an amount such that the degree of chain extension, based on the free isocyanate groups of the polyurethane prepolymer, is from 50 to 100 equivalent %, in particular from 60 to 90 equivalent %.

The polyurethane base dispersion obtained in process step (a3) then serves for the preparation of the polyurethane polymer hybrid dispersion in stage (b). In process step (b1), the polyurethane base dispersion from stage (a3) is mixed with a prepared mixture of preferably from 5 to 45% by weight of the monomer component (H) and preferably from 0.05 to 2% by weight of the initiator component (I) at a temperature of preferably from 15 to 35° C., in particular from 20 to 30° C. Thereafter, in process step (b2), the dispersion is heated and a free radical polymerization of the component (H) is carried out within the micelles of the polyurethane base dispersion as a result of the thermal decomposition of the component (I). The reaction stage (b2) is preferably carried out at a temperature which is within the range of ±10° C., based on the temperature at which the component (I) has a half-life of 1 hour. When 2,2'-azobisisobutyronitrile or 2,2'-azobis(2-methylpropionitrile) is used as component (I), the reaction stage (b2) is preferably carried out at a temperature of 80±10° C. According to a preferred embodiment, the molar initiator/monomer ratio of the components (H) and (I) is established in the range from 0.001 to 0.05 mol %, preferably at 0.008 mol %. After the end of the polymerization, the prepared polyurethane polymer hybrid dispersion is cooled and filtered.

The advantage of this preparation method is that monomers and initiators can be added together at room temperature and that no additional emulsifiers (surfactants) at all are required for their stabilization in the polyurethane dispersion. The charge density of the polyurethane micelles is sufficiently high to ensure the polymerization of the monomers within the micelles without emulsifiers—simply as a result of their stability. The stability of the polyurethane polymer hybrid micelles is retained over a long period without further stabilizing additives, even after the polymerization is complete. Experience has shown that the use of the prepolymer mixing process results in small amounts of byproducts which are not sufficiently stabilized in the polyurethane dispersion and thus settle out in the form of fine needles. These byproducts have to be separated from the dispersion by means of microfilters in a complicated manner. Surprisingly, dilution of the chain-extending agent with parts of the dispersing medium was capable of completely suppressing this effect.

The polyurethane polymer hybrid dispersion according to the invention is less complicated in terms of process engineering compared with the products known from the prior art, has a much less complicated composition and is thus an economical binder for applications in building chemistry, which reaches or surpasses commercially available products in its performance and its material properties.

The film hardness of the polyurethane polymer hybrid dispersions according to the invention is substantially greater than that of the corresponding hybrid dispersions not modified with fatty acids. Furthermore, the stability of the polyurethane polymer hybrid dispersions according to the invention to yellowing is substantially better compared with commercial fatty acid-modified polyurethane dispersions, since even small amounts of the fatty acid component result in the improved property profile.

The polyurethane dispersion according to the invention is outstandingly suitable as a binder for one- or two-component finishes, seals, adhesive bonds and coatings on the surfaces of mineral building materials, such as, for example, concrete, wood and wood-based materials, metal and plastics.

The advantages of the polyurethane polymer hybrid dispersion according to the invention, such as a high degree of hardness in combination with high flexibility of the tear-free films, good resistance to chemicals, high stability of the dispersion in a wide pH range, good stability in the freezing and thawing cycle and the use of economical raw materials, are achieved in a simplified synthesis pathway without subsequent chemical crosslinking, and simultaneously with a low content of organic solvent ($\leq 4\%$ by weight) and good film formation at temperatures of $\geq +10°$ C.

The examples which follow are intended to illustrate the invention in more detail.

EXAMPLE 1

Preparation of the Polyurethane Base Dispersions

Standard description for all polyurethane base dispersions (variants A to F): Isophorone diisocyanate was initially introduced into a four-necked flask equipped with KPG stirrer, reflux condenser, thermometer and nitrogen blanketing, and half the amount of a prepared polyol mixture, consisting of a polyesterpolyol (trade name: B 42H from Poliolchimica), a fatty acid-modified diol (condensate of bisphenol A diglycidyl ether and linseed oil fatty acid), 1,4-butanediol (from Aldrich), dimethylolpropionic acid (trade name: DMPA® from Mallinckrodt) and N-methylpyrrolidone (from Aldrich), was added. The mixture was stirred under a blanket of nitrogen at 80–90° C. until the exothermic reaction died down. After the addition of the second half of the polyol mixture, stirring was carried out under a nitrogen blanket at 80–90° C. until the calculated NCO content was reached (NCO/OH=1.40). The course of the reaction was monitored acidimetrically. If required, a mixture of drying agents (siccatives) was stirred into the prepolymer at 60° C. The prepolymer was then dispersed with thorough stirring into a mixture of demineralized water and triethylamine (100 mol %) (indirect neutralization). To synthesize the polyurethane dispersion, chain extension was effected with a mixture (1:1% by weight) of the ethylenediamine (70 equivalent %) and demineralized water.

Stable polyurethane base dispersions were obtained. The formulation data of the individual polyurethane base dispersions of variants A to F are summarized in table 1 below:

TABLE 1

| | Variant 1 A | Variant 1 B | Variant 1 C | Variant 1 D | Variant 1 E | Variant 1 F |
|---|---|---|---|---|---|---|
| Polyesterpolyol Bester 42 H (Oil number: 56.1 mg KOH g$^{-1}$) | 90.00 g | 70.00 g | 50.00 g | 90.00 g | 70.00 g | 50.00 g |
| Fatty acid-modified polyol | 10.00 g | 30.00 g | 50.00 g | 10.00 g | 30.00 g | 50.00 g |
| 1,4-Butanediol (BD 14) | 15.00 g | 15.00 g | 15.00 g | 15.00 g | 15.00 g | 15.00 g |
| Dimethylolpropionic acid (DMPA ®) | 16.00 g | 16.00 g | 16.00 g | 16.00 g | 16.00 g | 16.00 g |
| N-Methylpyrrolidone (NMP) | 50.00 g | 50.00 g | 50.00 g | 50.00 g | 50.00 g | 50.00 g |
| Isophorone diisocyanate (IPDI) | 106.70 g | 110.20 g | 113.60 g | 106.70 g | 110.20 g | 113.60 g |
| Siccative | — | — | — | yes | yes | yes |
| Drying agent 123 | — | — | — | 0.01 g | 0.04 g | 0.06 g |
| Cobalt 7 | — | — | — | 0.04 g | 0.11 g | 0.175 g |
| Calcium 10 | — | — | — | 0.12 g | 0.35 g | 0.58 g |
| NCO/OH | 1.40 | 1.40 | 1.40 | 1.40 | 1.40 | 1.40 |
| Prepolymer | 250.00 g | 250.00 g | 250.00 g | 250.00 g | 250.00 g | 250.00 g |
| Demineralized water | 438.00 g | 440.00 g | 440.00 g | 438.00 g | 440.00 g | 440.00 g |
| Triethylamine (TEA) | 10.48 g | 10.36 g | 10.24 g | 10.48 g | 10.36 g | 10.24 g |
| Ethylenediamine (EDA) | 4.94 g | 5.18 g | 5.30 g | 4.75 g | 4.93 g | 5.43 g |
| Demineralized water for 1:1 dilution with EDA | 4.94 g | 5.18 g | 5.30 g | 4.75 g | 4.93 g | 5.43 g |
| NCO content theory/found | 4.00/3.95 | 4.08/4.14 | 4.16/3.24 | 4.00/3.79 | 4.08/3.99 | 4.16/4.33 |
| Appearance | milky | milky | milky | milky | milky | milky |

TABLE 1-continued

|  | Variant 1 A | Variant 1 B | Variant 1 C | Variant 1 D | Variant 1 E | Variant 1 F |
|---|---|---|---|---|---|---|
| Solids content | 31.6% by weight | 31.6% by weight | 31.6% by weight | 31.6% by weight | 31.5% by weight | 31.5% by weight |
| pH | 7.20 | 7.15 | 7.30 | 7.20 | 7.25 | 7.15 |
| König hardness (after 7 days) according to DIN 53 157 | 135 s | 161 s | 179 s | 137 s | 163 s | 180 s |

Polyurethane Polymer Hybrid Dispersion having a High Degree of Film Hardness

For the preparation of the polyurethane polymer hybrid dispersions, in each case one of the polyurethane dispersions presented under example 1 (variants A to F) was used as a matrix for the emulsion polymerization of the olefinic monomers. The hybridization step took place as follows:

EXAMPLES 2 TO 7

The PU base dispersion (1) was initially introduced into a reaction vessel at room temperature and was diluted with water (2) with uniform stirring. Aqueous ammonia solution (3) was added until a pH of about 8.0 had been reached. n-Butyl acrylate (4), methyl methacrylate (5) and 2,2'-azobisisobutyronitrile (6) were thoroughly mixed separately in a vessel at room temperature and were added to the PU base dispersion in the course of from 90 to 120 min. After complete addition of the monomer-initiator solution, the dispersion was heated to 80 to 82° C. and was kept at this temperature for 5 hours. Thereafter, the dispersion was cooled to 25° C. and was filtered through a filter (pore size 80 μm). A finely divided milky opaque hybrid dispersion having a solids content of about 39% was obtained.

The hybridization step of examples 3 to 7 took place analogously to the procedure described in example 2. The substances used are shown in table 2 below:

TABLE 2

|  |  | Example 2 | Example 3 | Example 4 | Example 5 | Example 6 | Example 7 |
|---|---|---|---|---|---|---|---|
|  | PU base dispersion used from example | 1 A | 1 B | 1 C | 1 D | 1 E | 1 F |
| (1) | Amount of PU base dispersion | 140.00 g | 140.00 g | 140.00 g | 140.00 g | 140.00 g | 140.00 g |
| (2) | Demineralized water | 29.00 g | 29.00 g | 29.00 g | 29.00 g | 29.00 g | 29.00 g |
| (3) | Aqueous ammonia solution (25% strength) | 1.5 ml | 1.5 ml | 1.5 ml | 1.5 ml | 1.5 ml | 1.5 ml |
| (4) | n-Butyl acrylate (BA) | 6.30 g | 6.30 g | 6.30 g | 6.30 g | 6.30 g | 6.30 g |
| (5) | Methyl methacrylate (MMA) | 35.70 g | 35.70 g | 35.70 g | 35.70 g | 35.70 g | 35.70 g |
| (6) | 2,2'-Azobisisobutyronitrile (AIBN) | 0.53 g | 0.53 g | 0.53 g | 0.53 g | 0.53 g | 0.53 g |
|  | Appearance | milky white | milky white | milky white | milky white | milky white | milky white |
|  | Solids content (% by weight) | 40 | 40 | 40 | 40 | 40 | 40 |
|  | Viscosity (mPa · s) spindle 1, 60 rpm | 60.2 | 65.5 | 70.7 | 61.0 | 66.8 | 69.4 |
|  | pH | 7.75 | 7.90 | 8.10 | 8.05 | 7.50 | 8.05 |
|  | König hardness (after 7 days) according to DIN 53 157 | 143 s | 182 s | 188 s | 147 s | 183 s | 192 s |

What is claimed is:

1. A self-crosslinking polyurethane polymer hybrid dispersion based on oxidatively drying polyols having a high degree of film hardness, wherein it comprises the reaction components:

(A) an unsaturated fatty acid component capable of oxidative drying and having at least two hydroxyl groups reactive toward polyisocyanates comprising a reaction product of unsaturated fatty acids and at least one of aliphatic epoxy resins, aromatic epoxyresins or polyepoxides having two or three epoxide groups reactive toward fatty acids, (B) a polyol component consisting of
  (i) a high molecular weight polyol having at least two hydroxyl groups reactive toward polyisocyanates and a molar mass of from 500 to 4000 Dalton,
  (ii) a low molecular weight polyol having at least two hydroxyl groups reactive toward polyisocyanates and a molar mass of from 50 to 500 Dalton,
  (iii) a low molecular weight and anionically modifiable polyol having at least two hydroxyl groups reactive toward polyisocyanates and at least one carboxyl group inert to polyisocyanates and a molar mass of from 100 to 200 Dalton, (C) a polyisocyanate component, (D) optionally comprising a siccative component, (E) optionally comprising at least one solvent component selected from the group consisting of:
  (i) at least one organic solvent inert to polyisocyanates and
  (ii) a reactive diluent inert to polyisocyanates and consisting of at least one organic compound inert to polyisocyanates and having one or more double bonds capable of free radical polymerization, (F) at least one neutralization component selected from the group consisting of at least one inorganic or organic base, (G) a chain-extending component comprising at least one polyamine having two or more amino groups reactive toward polyisocyanates, (H) a monomer component comprising at least one monomer having one or more double bonds capable of free radical polymerization and (I) a free radical initiator component and contains water as the remainder.

2. The self-crosslinking polyurethane polymer hybrid dispersion as claimed in claim 1, characterized in that it contains the reaction components (A) from 0.3 to 12% by weight of an unsaturated fatty acid component capable of oxidative drying and consisting of at least one unsaturated fatty acid derivative or fatty acid epoxy ester having at least two hydroxyl groups reactive toward polyisocyanates, (B) from 1.5 to 18% by weight of a polyol component consisting of
  (i) from 0.5 to 12% by weight of a high molecular weight polyol having at least two hydroxyl groups reactive toward polyisocyanates and a molar mass of from 500 to 4000 Dalton,
  (ii) from 0.5 to 3.0% by weight of a low molecular weight polyol having at least two hydroxyl groups reactive toward polyisocyanates and a molar mass of from 50 to 500 Dalton,
  (iii) from 0.5 to 3.0% by weight of a low molecular weight and anionically modifiable polyol having at least two hydroxyl groups reactive toward polyisocyanates and at least one carboxyl group inert to polyisocyanates and a molar mass of from 100 to 200 Dalton, (C) from 3.5 to 16% by weight of a polyisocyanate component consisting of one or more polyisocyanates, polyisocyanate homologs or polyisocyanate derivatives having two or more aliphatic and/or aromatic isocyanate groups, (D) from 0 to 2% by weight of a siccative component consisting of at least one water-emulsifiable active or auxiliary drying agent, (E) from 0 to 8% by weight of a solvent component consisting of
  (i) at least one organic solvent inert to polyisocyanates and/or
  (ii) a reactive diluent inert to polyisocyanates and consisting of at least one organic compound inert to polyisocyanates and having one or more double bonds capable of free radical polymerization, (F) from 0.3 to 2.5% by weight of a neutralization component consisting of at least one inorganic or organic base, (G) from 0.1 to 1.5% by weight of a chain-extending component consisting of at least one polyamine having two or more amino groups reactive toward polyisocyanates, (H) from 5 to 45% by weight of a monomer component consisting of at least one monomer having one or more double bonds capable of free radical polymerization and (I) from 0.05 to 2% by weight of an initiator component consisting of at least one lipophilic free radical initiator, and contains water as the remainder.

3. The polyurethane polymer hybrid dispersion as claimed in claim 1, characterized in that the component (A) comprises a reaction product of mono-, di- or triunsaturated fatty acids having an iodine number of from 170 to 190 g $I_2$.(100 g)$^{-1}$, and aliphatic and/or aromatic epoxy resins or polyepoxides having an epoxide number >0.5 eq.(100 g)$^{-1}$.

4. The polyurethane polymer hybrid dispersion as claimed in claim 1, characterized in that the component (A) has an iodine number in the range from 100 to 150 g $I_2$.(100 g)$^{-1}$, a hydroxyl number of from 120 to 150 mg KOH.g$^{-1}$ and an acid number of from 1 to 5 mg KOH.g$^{-1}$.

5. The polyurethane polymer hybrid dispersion as claimed in claim 1, characterized in that the component (A) comprises an adduct of linseed oil fatty acid and bisphenol A diglycidyl ether.

6. The polyurethane polymer hybrid dispersion as claimed in claim 1, characterized in that the component (B) (i) comprises linear difunctional polyesterpolyols having a molar mass of from 1000 to 3000 Dalton.

7. The polyurethane polymer hybrid dispersion as claimed in claim 7, characterized in that the component (B) (i) comprises difunctional polyesterpolyols based on adipic acid, 1,4-butylene glycol and ethylene glycol.

8. The polyurethane polymer hybrid dispersion as claimed in claim 1, characterized in that the component (B) (ii) comprises 1,4-butylene glycol.

9. The polyurethane polymer hybrid dispersion as claimed in claim 1, characterized in that the component (B) (ii) comprises 1,4-butylene glycol in combination with trimethylolpropane.

10. The polyurethane polymer hybrid dispersion as claimed in claim 1, characterized in that the component (C) comprises isophorone diisocyanate.

11. The polyurethane polymer hybrid dispersion as claimed in claim 1, characterized in that the siccative component (D) comprises metal soaps or metal salts which consist of organometallic compounds soluble in organic solvents and binders and which accelerate the oxidative drying process of fatty acid-modified polyols.

12. The polyurethane polymer hybrid dispersion as claimed in claim 1, characterized in that the solvent component (E) (i) comprises high-boiling and hydrophilic compounds.

13. The polyurethane polymer hybrid dispersion as claimed in claim 1, characterized in that the solvent component (E) (i) comprises N-methylpyrrolidone.

14. The polyurethane polymer hybrid dispersion as claimed in claim 1, characterized in that the solvent component (E) (ii) comprises polyethylene glycols having one or more double bonds capable of free radical polymerization.

15. The polyurethane polymer hybrid dispersion as claimed in claim 14, characterized in that the solvent component (E) (ii) comprises methylpolyethylene glycol methacrylates having from 2 to 20 ethylene glycol units.

16. The polyurethane polymer hybrid dispersion as claimed in claim 1, characterized in that the neutralization component (F) comprises ammonia, tertiary amines and/or alkali metal hydroxides.

17. The polyurethane polymer hybrid dispersion as claimed in claim 16, characterized in that the neutralization component (F) comprises triethylamine.

18. The polyurethane polymer hybrid dispersion as claimed in claim 1, characterized in that the chain-extending component (G) comprises a difunctional primary amine.

19. The polyurethane polymer hybrid dispersion as claimed in claim 18, characterized in that the difunctional primary amine is 1,2-diaminoethane.

20. The polyurethane polymer hybrid dispersion as claimed in claim 1, characterized in that the polyurethane polymer consisting of the components (A) to (G) has an average molar mass of from 25,000 to 100,000 Dalton.

21. The polyurethane polymer hybrid dispersion as claimed in claim 1, characterized in that the component (H)

is selected from acrylic acid and its derivatives, methacrylic acid and its derivatives and/or styrene and its derivatives.

22. The polyurethane polymer hybrid dispersion as claimed in claim 1, characterized in that the component (H) contains combinations of from 75 to 85% by weight of methyl methacrylate, from 5 to 15% by weight of n-butyl acrylate and from 10 to 20% by weight of further monomers.

23. The polyurethane polymer hybrid dispersion as claimed in claim 1, characterized in that the component (H) contains a combination of 85% by weight of methyl methacrylate and 15% by weight of n-butyl acrylate or a combination of 75% by weight of methyl methacrylate, 15% by weight of n-butyl acrylate and 10% by weight of styrene.

24. The polyurethane polymer hybrid dispersion as claimed in claim 1, characterized in that the component (I) comprises a free radical initiator having one or more azo or peroxo groups.

25. The polyurethane polymer hybrid dispersion as claimed in claim 1, characterized in that the component (I) comprises a free radical initiator which has a half-life of 1 hour at a decomposition temperature within the range from 40 to 120° C., preferably from 70 to 90° C.

26. The polyurethane polymer hybrid dispersion as claimed in claim 1, characterized in that the component (I) comprises 2,2'-azobisisobutyronitrile.

27. The polyurethane polymer hybrid dispersion as claimed in claim 1, characterized in that the solids content of the polyurethane hybrid polymer is from 20 to 60% by weight, preferably from 30 to 50% by weight, based on the total weight of the polyurethane polymer hybrid dispersion.

28. The polyurethane polymer hybrid dispersion as claimed in claim 1, characterized in that the polyurethane hybrid polymer has an average molar mass of from 25,000 to 250,000 Dalton.

29. A process for the preparation of a polyurethane polymer hybrid dispersion comprising, characterized in that, in the reaction stage
    (a), a polyurethane base dispersion is first prepared,
    (a1) the fatty acid component (A), the polyol component (B) (i), (B) (ii) and (B) (iii) being reacted with a polyisocyanate component (C), optionally in the presence of a siccative component (D) and of the solvent component (E) and optionally in the presence of a catalyst to give a polyurethane prepolymer,
    (a2) the polyurethane prepolymer from stage (a1) being mixed with the dispersing medium and the neutralization component (F) and then
    (a3) the polyurethane prepolymer dispersion from stage (a2) being reacted with the chain-extending component (G),
and then, in the reaction stage (b), a polyurethane polymer hybrid dispersion being prepared by
    (b1) adding a prepared mixture of the monomer component (H) and of the initiator component (I) to the polyurethane base dispersion from stage (a3) and then
    (b2) carrying out a free radical polymerization of the component (H) within the micelles of the polyurethane base dispersion by thermal decomposition of the component (I).

30. The process as claimed in claim 29, characterized in that, in reaction stage (a), a polyurethane base dispersion is first prepared,
    (a1) from 0.3 to 12% by weight of the unsaturated fatty acid component (A) capable of oxidative drying, from 0.5 to 12% by weight of the high molecular weight polyol component (B) (i), from 0.5 to 3.0% by weight of the low molecular weight polyol component (B) (ii) and from 0.5 to 3.0% by weight of the low molecular weight and anionically modifiable polyol (B) (iii) being reacted with from 3.5 to 16% by weight of the polyisocyanate component (C), optionally in the presence of from 0 to 2% by weight of the siccative component (D) and from 0 to 6% by weight of the solvent component (E) and optionally in the presence of a catalyst to give a polyurethane prepolymer,
    (a2) the polyurethane prepolymer from stage (a1) being mixed with the dispersing medium and from 0.3 to 2.5% by weight of the neutralization component (F) and then
    (a3) the polyurethane prepolymer dispersion from stage (a2) being reacted with from 0.1 to 1.5% by weight of the chain-extending component (G)
and then, in reaction stage (b), a polyurethane polymer hybrid dispersion is prepared by
    (b1) mixing the polyurethane base dispersion from stage (a3) with a prepared mixture of from 5 to 45% by weight of the monomer component (H) and from 0.01 to 1.5% by weight of the initiator component (I) and then
    (b2) carrying out a free radical polymerization of the component (H) within the micelles of the polyurethane base dispersion by thermal decomposition of the component (I).

31. The process as claimed in with claim 29, characterized in that the reaction stage (a1) is carried out in the presence of from 0.01 to 1% by weight, based on the components (A), (B), (C), (D) and (E), of a catalyst suitable for polyaddition reactions with polyisocyanates.

32. The process as claimed in claim 29, characterized in that the siccative component (D) is not initially introduced in the dispersing medium until reaction stage (a2).

33. The process as claimed in claim 29, characterized in that a direct neutralization of the component (B) (iii) is effected, the neutralization component (F) being stirred into the polyurethane prepolymer after reaction stage (a1).

34. The process as claimed in claim 29, characterized in that an indirect neutralization of the component (B) (iii) is effected, a dispersing medium containing the neutralization component (F) being used in step (a2).

35. The process as claimed in claim 29, characterized in that the component (G) is added in reaction stage (a3) in solution in the dispersion medium.

36. The process as claimed in claim 29, characterized in that the reaction stage (b1) is carried out at a temperature of from 15 to 35° C., preferably at from 20 to 30° C.

37. The process as claimed in claim 29, characterized in that the reaction stage (b2) is carried out at a temperature which is within a range of ±10° C., based on the temperature at which the component (I) has a half-life of 1 hour.

38. The process as claimed in claim 29, characterized in that the polymerization in the reaction stage (b2) is carried out without further emulsifiers.

39. The process as claimed in claim 29, characterized in that the reaction stage (b2) is carried out at a temperature of 80±10° C. with the use of 2,2'-azobisisobutyronitrile as component (I).

40. The polyurethane polymer hybrid dispersion as claimed in claim 1, wherein component (B) (iii) comprises a bishydroxyalkane-carboxylic acid.

41. The polyurethane polymer hybrid of claim 40, wherein said bishydroxyalkane carboxylic acid is dimethylolpropionic acid.

42. The polyurethane polymer hybrid dispersion as claimed in claim 1, wherein component (G) contains from 20 to 80% by weight of a dispersing medium.

43. The polyurethane polymer hybrid dispersion as claimed in claim 42, wherein component (G) contains about 50% by weight of dispersing medium.

44. The polyurethane polymer hybrid dispersion as claimed in claim 1, wherein the solids content of the polyurethane polymer consisting of the components (A) to (G) is from 20 to 60% by weight based on the total weight of the polyurethane dispersion.

45. The polyurethane polymer hybrid dispersion as claimed in claim 44, wherein the solids content of the polyurethane polymer consisting of the components (A) to (G) is from 30 to 50% by weight based on the total weight of the polyurethane dispersion.

46. The polyurethane polymer hybrid dispersion as claimed in claim 1, wherein the mean particle size of the micelles of the polyurethane polymer consisting of the components (A) to (G) is from 50 to 500 nm.

47. The polyurethane polymer hybrid dispersion as claimed in claim 46, wherein the mean particle size of the micelles of the polyurethane polymer consisting of the components (A) to (G) is from 100 to 200 nm.

48. The polyurethane polymer hybrid dispersion as claimed in claim 1, wherein the polyurethane polymer consisting of the components (A) to (G) has an average molar mass (number average $M_n$) of from 25,000 to 100,000 Dalton.

49. The polyurethane polymer hybrid dispersion as claimed in claim 1, wherein the ratio of the proportionate solids contents of polyurethane resin and polymer resin is 20 to 80:80 to 20% by weight.

50. The polyurethane polymer hybrid dispersion as claimed in claim 49, wherein the ratio of the proportionate solids contents of polyurethane resin and polymer resin is 40 to 60:60 to 40% by weight.

51. The polyurethane polymer hybrid dispersion as claimed in claim 50, wherein the ratio of the proportionate solids contents of polyurethane resin and polymer resin is about 50:50% by weight.

52. The polyurethane polymer hybrid dispersion as claimed in claim 1, wherein the mean particle size of the micelles of the polyurethane hybrid polymer is from 50 to 500 nm.

53. The polyurethane polymer hybrid dispersion as claimed in claim 52, wherein the mean particle size of the micelles of the polyurethane hybrid polymer is from 50 to 250 nm.

54. The polyurethane polymer hybrid dispersion as claimed in claim 1, wherein the polyurethane hybrid polymer has an average molar mass (number average $M_n$) of from 25,000 to 250,000 Dalton.

55. The process as claimed in claim 30, wherein the reaction stage (a1) is carried out at a temperature of from 60 to 120° C.

56. The process as claimed in claim 55, wherein the reaction stage (a1) is carried out at a temperature of from 80 to 100° C.

57. The process as claimed in claim 29, wherein the NCO/OH equivalent ratio of the components (A), (B) and (C) in reaction stage (a1) is established at a value of from 1.2 to 2.0.

58. The process as claimed in claim 57, wherein the NCO/OH equivalent ratio of the components (A), (B) and (C) in reaction stage (a1) is established at a value of from 1.4 to 1.8.

59. The process as claimed in claim 29, wherein the reaction stage (a2) is carried out at a temperature of from 30 to 60° C.

60. The process as claimed in claim 59, wherein the reaction stage (a2) is carried out at a temperature of from 40 to 50° C.

61. The process as claimed in claim 29, wherein component (F) is added in an amount such that the degree of neutralization, based on the free carboxyl groups of the polyurethane prepolymer, is from 70 to 100 equivalent %.

62. The process as claimed in claim 61, wherein component (F) is added in an amount such that the degree of neutralization, based on the free carboxyl groups of the polyurethane prepolymer, is from 90 to 100 equivalent %.

63. The process as claimed in claim 29, wherein the reaction stage (a3) is carried out at a temperature of from 20 to 60° C.

64. The process as claimed in claim 61, wherein the reaction stage (a3) is carried out at a temperature of from 30 to 50° C.

65. The process as claimed in claim 29, wherein component (G) is used in an amount such that the degree of chain extension, based on the free isocyanate groups of the polyurethane prepolymer is from 50 to 100 equivalent %.

66. The process as claimed in claim 65, wherein component (G) is used in an amount such that the degree of chain extension, based on the free isocyanate groups of the polyurethane prepolymer is from 60 to 90 equivalent %.

67. The process as claimed in claim 29, wherein the reaction stage (b1) is carried out at a temperature of from 15 to 35° C.

68. The process as claimed in claim 65, wherein the reaction stage (b1) is carried out at a temperature of from 20 to 30° C.

69. The process as claimed in claim 29, wherein the molar initiator/monomer ratio of the components (H) and (I) is established at values of from 0.001 to 0.05 mol %.

70. The process as claimed in claim 69, wherein the molar initiator/monomer ratio of the components (H) and (I) is established at 0.008 mol %.

* * * * *